Nov. 16, 1954  K. WOLTER  2,694,566
FORCE MEASURING DEVICE
Filed Aug. 26, 1949
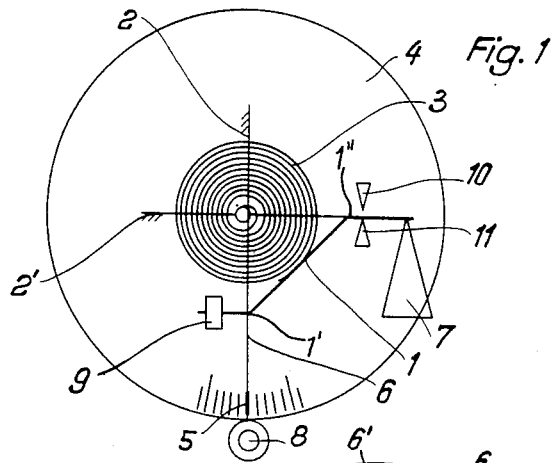
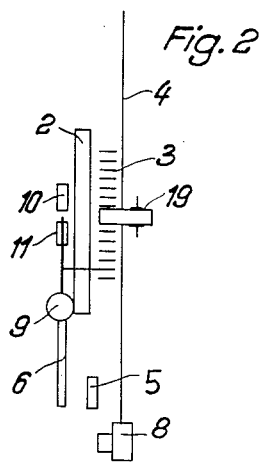
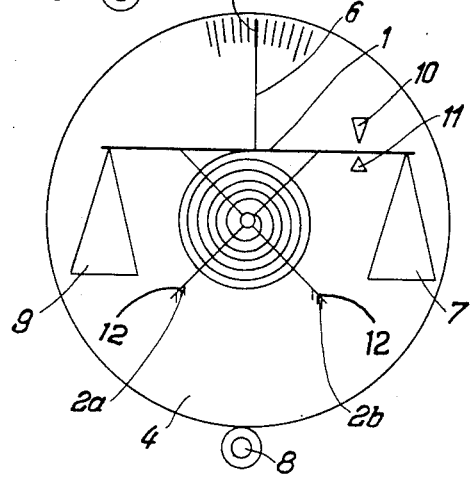
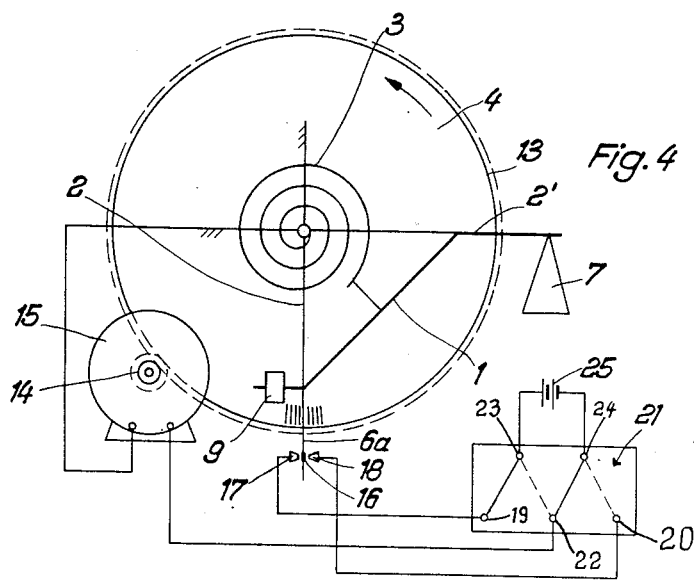
Inventor:
KURT WOLTER
BY:

United States Patent Office 2,694,566
Patented Nov. 16, 1954

2,694,566

FORCE MEASURING DEVICE

Kurt Wolter, Stuttgart, Germany, assignor to August Sauter KG. Fein- und Schnellwaagen-Fabrik, Ebingen, Wurttemberg, Germany, a firm Application August 26, 1949, Serial No. 112,448

Claims priority, application Germany October 1, 1948

6 Claims. (Cl. 265—70)

The invention relates to measuring implements of all kinds, in which the tension of a measuring torsional spring is balanced by the load of the movable system. More particularly the invention relates to torsion spring balances in which the tension of a torsional f. i. of a spiral spring is balanced by the weight of the load being weighed. Therefore hereinafter reference is made to torsion spring balances as an example in which the invention can be used but it is to be understood that all statements made with respect to balances are applicable in a more general frame to any force measuring device of the kind referred to.

If in balances of this type the spiral spring is suspended in the usual manner from an axle mounted in friction bearings, there will be the drawback, that the efficiency of the balance is limited by the friction in the bearing. In the known balances it is further necessary before starting weighing first to adjust the exact position of equilibrium with respect to a fixed point and then to read the amount of weight on the stationary dial at a point which is determined by the load applied and therefore to be found each time at a different place of said dial.

The invention eliminates all of these drawbacks and relates to a torsion spring balance or other force measuring devices operating without external friction in which with the application of a turning dial the position of equilibrium and the amount of weight or of other values may be read independently of its size at always the same point of the balance or other implement. The new apparatus consequently operates with a greater degree of accuracy and sensibility and further permits more reliable and quicker ascertainment of the weight or of other values.

The forementioned features of the invention can be realized by suspending the movable system of the measuring implement f. i. the weighing mechanism (balance beam, scale-pans etc.) from a special spring arrangement which both in the zero position and in the position for measuring (after the load has been balanced by the measuring torsional spring) does not exert a directing force on the movable system weighing mechanism. The measuring spring as such is in no way under the load of the movable system.

As a measuring spring any type of spring may be used which is capable of being loaded by torsion or twisting. Accordingly it may consist for instance of a spiral spring or a helical spring, or of a wire or a rod inasmuch as the force to be applied in distorting be proportional to the torsional angle. As a suspension spring for the movable system conveniently a leaf spring or a combination of parallel laminated springs may find application.

In the drawings some forms of embodiment are shown by way of example with respect to balances.

Fig. 1 shows a front view of a torsion spring balance according to the invention;

Fig. 2 shows a side view of Fig. 1;

Fig. 3 shows a front view of another form of embodiment of a torsion spring balance according to the invention;

Fig. 4 shows a front view of a further conformation of the torsion spring balance according to Figs. 1 and 2.

In the torsion spring balance according to Figs. 1 and 2 the inner end of the measuring spiral spring 3 is secured to the center of a dial 4 provided with a graduation for indicating the weight. The outer end of the spiral torsion spring 3 is connected to a cross spring link consisting of a vertical leaf spring 2 and the horizontal leaf spring 2'. The load supporting means include a balance beam 1 secured at 1' to the leaf spring 2 and at 1'' to leaf spring 2', the scale pan 7, and a counter-balancing means 9. A pointer 6 is secured to balance beam 1. The deflection of the beam 1 is limited by the stops 10 and 11. Turning of the dial 4 in both directions is effected in a known manner by means of a manually turnable member 8. Adjacent the pointer 6 and the dial 4 is a reference means 5 for indicating the zero position of the pointer and of the vertical leaf spring 2.

The adjustment of the pointer 6 to the initial line of the dial 4 and of reference means 5 is effected with the aid of the counter-balancing means 9. In this initial position the balance beam 1 must freely play between the fixed stops 10 and 11, and the pointer 6 together with the fixed zero mark on member 5 and the initial line of the dial must be in a plane perpendicular to the dial 4. In this position the leaf spring 2 is intended to be only subject to tensile load while there is no load on the leaf spring 2' and the measuring spring 3, which latter, however, under certain circumstances may be slightly preloaded.

When depositing a load on the scale pan 7, a turning moment bends the leaf springs 2 and 2' and the spiral spring 3. Simultaneously the balance beam 1 abuts on the lower stop 10. The weight of the load is now ascertained in such a manner that the dial 4 is turned in a sense contrary to the direction of the load force until the pointer 6 coincides with the fixed zero mark on member 5, whereupon behind both of them the amount of weight may be read on the dial 4. In this position of equilibrium only the spiral spring 3 counterbalances the load, the remaining system being in the same condition as in the initial position.

After removal of the load the balance beam 1 abuts the upper stop 11, whereupon by turning back the dial the balance is returned to its initial position which is reached when the pointer 6, the zero mark on member 5 and the initial line of the dial are exactly aligned.

In the torsion spring balances hitherto known the weighing mechanism is made as light as possible, as it must be suspended as a whole or in part from the measuring spring, this being the reason why its elastic force only in part can be utilized for weighing as such, inasmuch as there is proportionality between load and torsional angle which is the case up to a torsional angle of about 250°. In the balance according to the invention, however, proportionality may be realized over a range of 360° or even two times 360° and more, depending on the length of the measuring spiral spring band. In this case the elastic force of the measuring spring must be so selected that the maximum load to be weighed corresponds to a torsional movement of the measuring spring over 360° or two times 360° and more.

The circumstance, that in the known types of balances the measuring spring is provided to support wholly or at least in part the weighing mechanism determines the upper limit of the weighing range for which these balances can be designed, this weighing range covering loads from a few thousandths of one gram to one gram. With increasing load the frictional force in the bearings of the balance increases too and this friction must no longer be neglected with loads above one gram. As in the torsion spring balance according to the invention the measuring spring, as already mentioned, only serves to counterbalance the load while the suspension spring arrangement, i. e. in the example of construction the spring link, supports the dead load so that no bearing friction occurs, the balance according to the invention may be manufactured for heavier loads.

Fig. 3 shows a torsion spring balance, which differs from the torsion spring balance described above only by the arrangement of the supporting leaf springs. According to Fig. 3 the leaf springs 2a and 2b supporting the weighing mechanism extend obliquely with respect to the balance beam 1, each of the springs being connected to another side of the balance beam and supported at the lower end thereof on supports 12, but they may also be suspended at their upper ends. In all of the positions of the balance the springs transmit to both sides of the balance equal forces which therefore compensate each other, so that also in this case the leaf springs 2a and 2b do not exert a directing force. In the embodiment of Fig. 3 the balance beam 1 carries on its ends a scale pan 7 for the load and a scale pan 6 for additional weights for extending the weighing range. If it be intended to weigh a load surpassing the force of the measuring spring which corresponds its basic maximum load of e. g. 1 gram, an integral multiple of the basic maximum load will be deposited on the scale pan. Then the load corresponds to the sum resulting from the weight deposited plus the amount of weight read on the dial.

The necessary damping of the balance and the readjustment of the zero position of the dial may be effected with known means. The compensation for variations of temperature may be limited to the measuring spring and be effected by selecting a spring material of low temperature coefficient.

A further modification of the balance according to Figs. 1 and 2 or 3 consists in that turning of the dial 4 and accordingly the adjustment of the position of equilibrium of the balance and, if need be, also the return of the balance into the zero position is effected by means of a motor, preferably a direct-current motor, effecting the drive of the rotatable dial through the intermediary of a pinion and a rim gear. The motor is preferably provided with automatic control means disconnecting the same in the position of equilibrium and in the zero position respectively.

Fig. 4 shows a type of balance substantially according to Figs. 1 and 2 with such an automatic controlled motor drive.

In the form of embodiment according to Fig. 4 the rim of the rotatable dial 4 is provided with a gear rim 13 with which the pinion 14 of the power delivering direct-current motor 15 meshes. The circuit of this motor leads over the extended pointer portion 6a which carries a contact 16 and which in the no-load condition of the balance is playing freely between the fixed contacts 17 and 18. The contacts 17 and 18 are connected to the terminals 19 and 20 of a pole-changing switch 21, the terminal 22 of this switch being connected to one terminal of the motor 15 and the terminals 23 and 24 to the direct-current source 25.

Before starting a weighing operation, the pole-changing switch 21 is moved into the position shown in full lines. If thereupon a load is deposited on the weigh pan 7, the contact 16 engages the contact 17, thereby closing the circuit of the motor 15 which turns the dial 4 in the direction of the arrow. The position of equilibrium once being established, the contact 16 separates from the contact 17 so that the circuit is interrupted and the motor stops.

After having read the amount of weight in the manner described in connection with Figs. 1 and 2, the pole-changing switch 21 is moved into the position shown in dotted lines and the load removed, whereby the pointer 6 owing to the tension of the spring 3 engages the contact 18. The motor 15 now revolves in the opposite direction thus turning the dial 4 again into the zero position, whereupon the contact 16 is separated from the contact 18 owing to the fact that the spring 3 is no longer under tension so that the motor stops. Thus the adjustment of the dial 4 in conformity with the load and its return into the zero position are effected automatically and the attendant only needs to take care of the switching and the reading.

If desired, a circuit breaker may be interconnected between the direct-current source G1 and the pole-changing switch P.

The torsion spring balance as described in various forms of embodiment cannot only be used for the purpose of weighing, but also in general for measuring forces.

I claim:

1. A force measuring device comprising, in combination, supporting means; a straight vertical leaf spring downwardly projecting from said supporting means; a horizontal leaf spring supported by said supporting means at one end and crossing said vertical leaf spring; movable load supporting means secured at longitudinally spaced points thereof to said leaf springs spaced from the crossing point and from the supported ends of the same, said load supporting means being suspended in the center of gravity thereof from said vertical leaf spring and being in equilibrium and in a zero position when said vertical leaf spring is in a straight unbent position; measuring spiral torsion spring means having an inner end and an outer end and being secured at said outer end to said load supporting means; a dial supported on said supporting means rotatable about a horizontal axis, said inner end of said spiral torsion spring means being located in the region of said axis and being secured to said rotatable dial so as to be tensioned when the same is rotated for counterbalancing a load acting on said load supporting means and bending said leaf springs and for returning said load supporting means to said zero position; a pointer secured to said load supporting means and cooperating with said dial; and means indicating the zero position of said load supporting means.

2. A force measuring device comprising, in combination, supporting means; a straight vertical leaf spring downwardly projecting from said supporting means; a horizontal leaf spring supported by said supporting means at one end and crossing said vertical leaf spring at a crossing point spaced the same distance from the supported ends of said leaf springs; movable load supporting means secured at longitudinally spaced points thereof to said leaf springs spaced from the crossing point and from the supported ends of the same the same distance so as to extend at an angle of 45° with respect to said leaf springs, said load supporting means being suspended in the center of gravity thereof from said vertical leaf spring and being in equilibrium and in a zero position when said vertical leaf spring is in a straight unbent position; measuring spiral torsion spring means having an inner end and an outer end and being secured at said outer end to said load supporting means; a dial supported on said supporting means rotatable about a horizontal axis passing through said crossing point of said leaf springs, said inner end of said spiral torsion spring means being located in the region of said axis and being secured to said rotatable dial so as to be tensioned when the same is rotated for counterbalancing a load acting on said load supporting means and bending said leaf springs and for returning said load supporting means to said zero position; a pointer secured to said load supporting means and cooperating with said dial; and means indicating the zero position of said load supporting means.

3. A force measuring device as claimed in claim 2 and including electric motor means operatively connected to said rotatable dial for rotating the same and including a circuit; switch means in said circuit and actuated by said pointer means to disconnect said electric motor means when said load supporting means are in said zero position, and connecting said electric motor means in displaced position of said load supporting means.

4. A force measuring device comprising, in combination, supporting means; a vertical leaf spring downwardly projecting from said supporting means; a horizontal leaf spring supported by said supporting means at one end and crossing said vertical leaf spring; a beam secured at longitudinally spaced points thereof to said leaf springs spaced from the crossing point and from the supported ends of the same, and arranged on one side of said vertical leaf spring; a weight pan supported on one end of said beam; a counterweight means secured to the other end of said beam and located on the other side of said vertical leaf spring means and balancing said beam and said weight pan in a vertical unbent zero position of said vertical leaf spring; measuring torsion spring means secured at one end thereof to said beam; a dial supported on said supporting means rotatable about a horizontal axis and being secured in the region of said axis to the other end of said torsion spring means and tensioning the same during rotation for counterbalancing a load acting on said weight pan means; a pointer secured to said beam and cooperating with said dial; and means indicating the zero position of said vertical leaf spring.

5. A force measuring device as claimed in claim 4 wherein said one end of said torsion spring means is secured to said beam at a point located intermediate and spaced equal distances from said longitudinally spaced points of said beam.

6. A force measuring device as claimed in claim 4 wherein said counterweight means is a weight pan adapted to support weights corresponding to multiples of the maximal load of said measuring torsion spring means for extending the measuring range of the device.

(References on following page)

References Cited in the file of this patent

UNITED STATES PATENTS

| Number | Name | Date |
|---|---|---|
| 246,057 | Abbott | Aug. 23, 1881 |
| 272,699 | Ide | Feb. 20, 1883 |
| 352,753 | Hosea | Nov. 16, 1886 |
| 392,617 | Lieb | Nov. 13, 1888 |
| 789,781 | Wynne | May 16, 1905 |
| 1,952,171 | Jones | Mar. 27, 1934 |
| 2,124,968 | Ahrndt | July 26, 1938 |
| 2,352,906 | Lyons | July 4, 1944 |
| 2,417,392 | Craig | Mar. 11, 1947 |
| 2,503,697 | Weckerly | Apr. 11, 1950 |

FOREIGN PATENTS

| Number | Country | Date |
|---|---|---|
| 350,590 | Great Britain | June 18, 1931 |
| 628,509 | Germany | Apr. 6, 1936 |